United States Patent [19]

Felstehausen

[11] Patent Number: 4,667,369
[45] Date of Patent: May 26, 1987

[54] EXTRUSION APPARATUS FOR GROUND MEAT

[75] Inventor: Eugene F. Felstehausen, Hoopeston, Ill.

[73] Assignee: Sheldon O. Zisook, Bannockburn, Ill.

[21] Appl. No.: 835,193

[22] Filed: Mar. 3, 1986

[51] Int. Cl.⁴ .............................................. A22C 7/00
[52] U.S. Cl. ..................................... 17/32; 425/404; 425/463; 425/467; 17/41
[58] Field of Search ................ 425/404, 437, 461–643, 425/466, 467, 308; 17/32, 41

[56] References Cited

U.S. PATENT DOCUMENTS

| 916,088 | 3/1909 | Allen | 425/467 |
| 2,670,296 | 2/1954 | Tansley | 426/513 |
| 3,512,213 | 5/1970 | De Villers et al. | 17/32 |
| 4,470,793 | 9/1984 | Caralli | 425/467 |

Primary Examiner—Bernard Nozick
Attorney, Agent, or Firm—Leydig, Voit & Mayer

[57] ABSTRACT

An extrusion nozzle for ground meat which has forwardly mounted perforation rods, aligned and retained within tubular housings, with each lateral rod having a slight bend so that it is generally parallel with the interior walls of the nozzle. The nozzle attaches to a conventional meat grinder which forces the semi-frozen ground meat into the nozzle and compacts and extrudes the shapeless meat into a densely packed, bricklike shape having multiple perforations without the requirement for external heating. This nozzle affords ease in cooking and enhanced flavor, is easily cleaned, requires minimum disassembly, and is structurally supported to withstand internal pressures.

6 Claims, 9 Drawing Figures

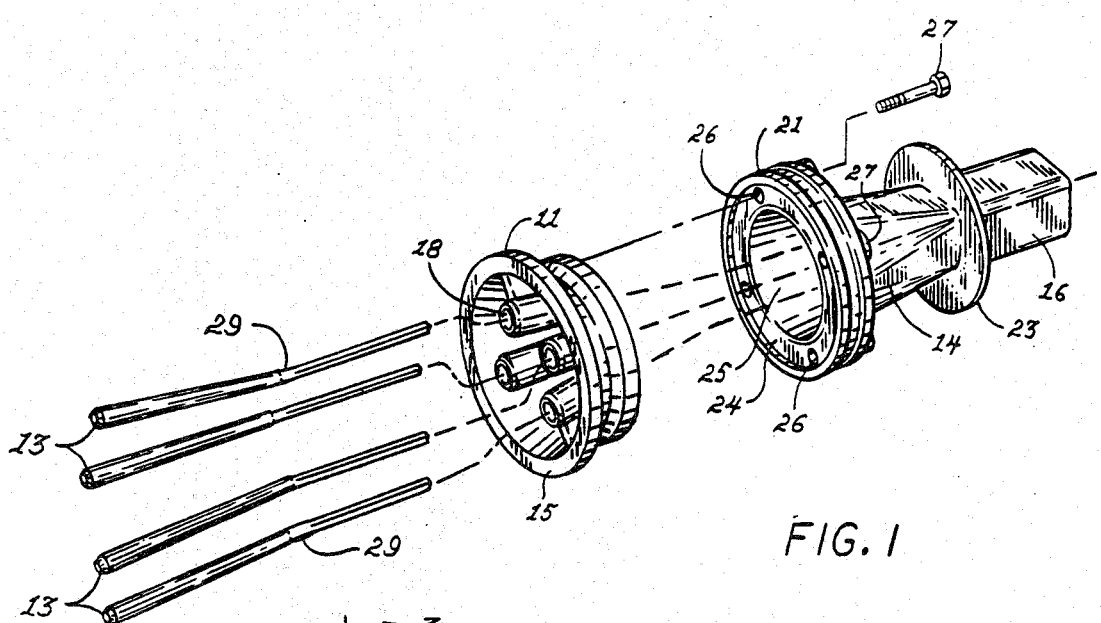
FIG. 1
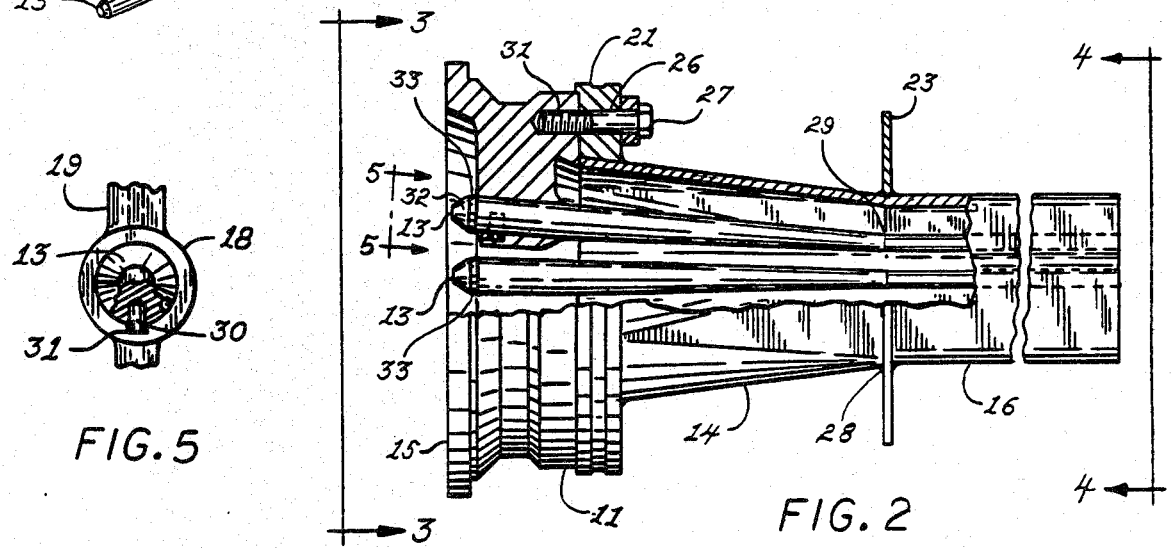
FIG. 5
FIG. 2
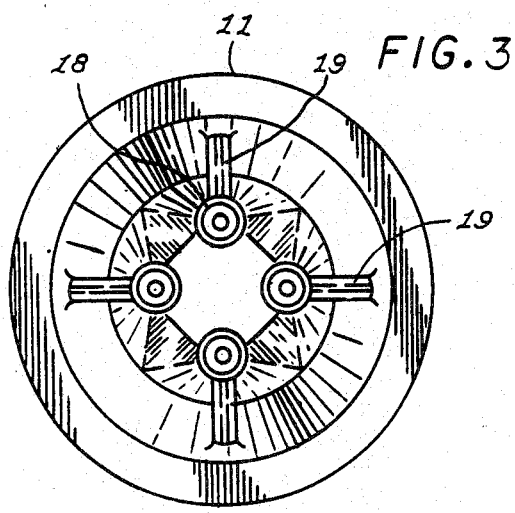
FIG. 3
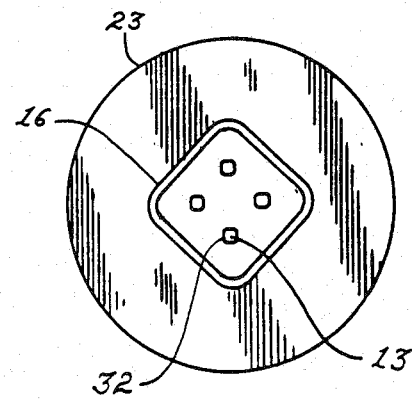
FIG. 4

EXTRUSION APPARATUS FOR GROUND MEAT

BACKGROUND OF THE INVENTION

This invention deals primarily with an apparatus used to form, shape, and compact ground meat into a square-shaped block preferably having a plurality of perforations longitudinally extending through the block of ground meat. More particularly, the invention relates to an apparatus of the foregoing type which is attached to a meat grinder or the like to continuously form a block of meat that can be cut into patties including ones having a pattern of perforations.

The use of pre-formed, frozen meat patties in the food industry has long been recognized as a fast and easy method for the preparation of fast-food hamburgers. The process generally begins with the grinding of frozen or semi-frozen meat. It has been long recognized that meat at low temperature could be easily shaped and still be sufficiently cold to prevent bacterial growth particularly when the ground meat is forced by the action of the meat grinder into an apparatus attached to the output nozzle of a meat grinder. Such an apparatus acts as an extruder with continuously decreasing diameters through which the ground meat is forced, thereby shaping and compacting the ground meat.

In addition, it has been known that provision of perforations in the meat patties expedited the time required for cooking and enhanced the flavor of the meat. With the extrusion nozzle type of patty forming these perforations were produced through the insertion of a desired pattern of solid rods into the extrusion apparatus and the meat was compressed around these rods, thereby producing perforations in the solid block of meat as it exits the extruder. When the block is then cut into patties each will have the pattern of perforations determined by the number and disposition of the nozzle rods.

This method of the extrusion of ground meat is generally illustrated in U.S. Pat. No. 2,670,296, now expired. The design there shown, however, was recognized to have had certain flaws which enhanced the tendency for the meat to freeze up in the mechanism and provided certain internal surfaces which were difficult to clean.

The above mentioned U.S. Pat. No. 2,670,296 for the preparation of meat patties was subsequently improved as shown and described in U.S. Pat. No. 3,512,213 wherein an extrusion nozzle was provided with detachable nozzle sections for dealing with cleaning aspects, but which still required an electrically energized heating device to provide warmth in order to prevent freezing within the mechanism. The internal rods were securely mounted on a core device located well within the sectional extruder nozzle and the rod ends extended outwardly past the end of the apparatus.

The multi-sectional, detachable nature of this extruder nozzle is also believed to have required supplemental heating to prevent freeze ups and offered a significant number of areas at sectional interfaces and around the detachable frame which would still be difficult to clean and can impede the smooth flow of meat through the extruder nozzle.

SUMMARY OF THE INVENTION

Accordingly, the principal object of the present invention is to provide an improved extrusion apparatus for a meat grinder or the like that forms ground meat through pressure into a brick-like shape, and which may include perforations, so that the formed meat can be then longitudinally sliced to create individual meat patties.

Still another object is to provide a collar-like section adapted to be attached to the discharge end of a meat grinder or the like, which provides independently supported housings for separate insertion of a plurality of perforation rods with the collar being adapted for the attachment of the shaping nozzle of the extrusion apparatus.

Another object of the invention is to provide a plurality of individually insertable perforation rods mounted close to the outlet of the extruder apparatus so that the shaping around the rods can begin immediately when the semi-frozen meat has been slightly warmed by the grinding process and when the pressure of the meat is at its lowest point thereby substantially minimizing or eliminating the requirement for external heating.

It is a further object of the invention to provide a streamlined interior surface which permits ease in clearing, facilitates the movement of the compacted ground meat through the extrusion apparatus, and prevents the freeze-up of the meat within the extruder apparatus.

An additional object of the invention is to shape the perforation rods in such a manner as to maximize the ease of flow through the extruder nozzle.

Yet another object of the invention is to provide support housings for the perforation rods which incorporate a means for properly aligning the perforation rods and holding them in position, and yet provide minimum impedance to the flow of ground meat.

Other objects and advantages will become apparent upon reference to the following specification and appended drawings.

BRIEF DESCRIPTION OF THE DRAWINGS

The appended drawings show illustrative embodiments of the invention, without limitations thereto. In the drawings, like elements are identified by like symbols in each of the views and:

FIG. 1 is an exploded perspective view of the extrusion apparatus of my present invention.

FIG. 2 is a cross-sectional side view of the extrusion apparatus showing the decreasing diametrical nozzle-like shape and the internal placement of the rods.

FIG. 3 is a rear plan view taken along line 3—3 showing the rod mounting fixtures, the placement and location of the rods, and the diametrically decreasing extrusion nozzle.

FIG. 4 is a front plan view taken along line 4—4 showing the end of the extrusion apparatus and the rod pattern.

FIG. 5 is a rear plan view taken along line 5—5 with a partial cross-section showing the keyway in the mounting fixture and alignment pin in a perforation rod.

DESCRIPTION OF THE INVENTION

Figure 6:
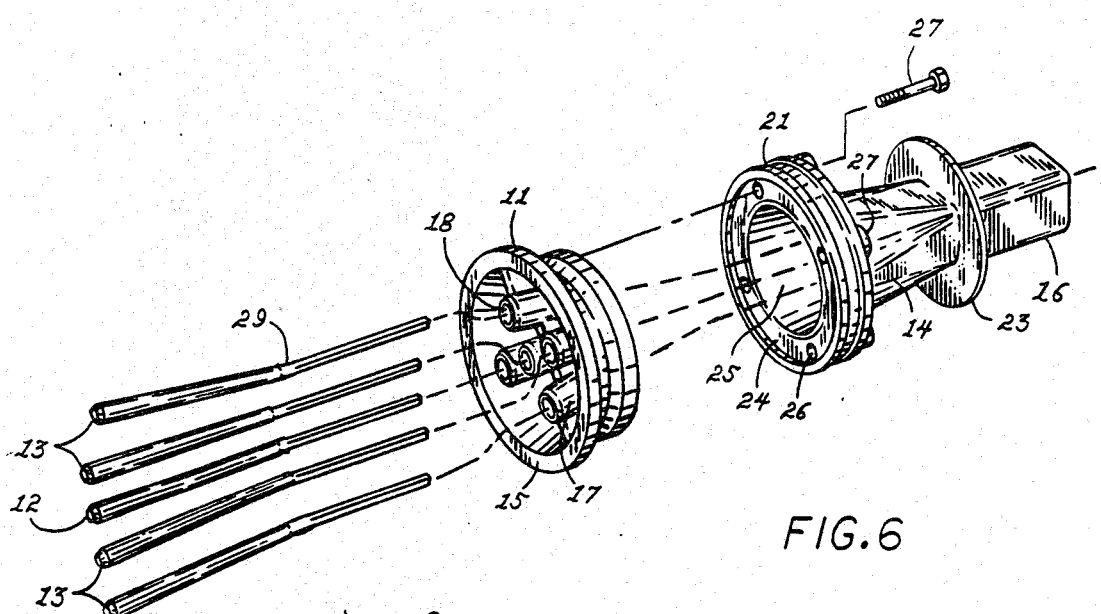
FIG. 6 is an exploded perspective view of the extrusion apparatus in an embodiment with five perforation rods.

Referring to FIG. 1, the extrusion apparatus is generally conical in shape, consisting of a collar section 11, perforation rods 13, a shaping section 14, and a finishing section 16.

The collar section 11 is the primary element on the extrusion apparatus, being adapted for attachment to a meat grinder or the like having a discharge nozzle typical of such devices. The collar also provides internal support for the perforation rods 13, and is arranged to receive the attachment of the shaping elements of the extrusion apparatus. The near end is viewed to the left of FIG. 1 of the collar section 11 is constructed to mate with and be secured by a typical clamping ring (not shown) on a conventional meat grinding machine or the like.

The collar section 11 is axially bored with progressively decreasing diameters, being internally shaped like a truncated funnel, as can be seen in FIGS. 2 and 3. Forwardly mounted within the collar section 11 are independently supported tubular housings 18 for the support of the perforation rods 13 during operation. Each housing 18 has tapered front and rear edges and is mounted on a support arm 19, also having tapered edges, to minimize obstruction within the nozzle. The housings 18 are angled slightly so that each is generally axially parallel with the interior wall of the nozzle. In the preferred embodiment, there are four such tubular housings 18. Referring to FIG. 5, each tubular housing 18 has a keyway 31 to accommodate the locating pin 30 on each perforation rod 13, thereby properly aligning each rod with the shape of the apparatus.

There are four lateral perforation rods 13 which extend from the front of the collar section 11 to the far end of the finishing section 16, longitudinally tapered and with a slight bend 29 near the middle so that they are axially aligned with the finishing section 16. From the point of bending 29, each rod 13 is formed into a squared shape 32, having rounded edges, as can be seen in FIG. 4.

Each rod 13 also has a flanged end 33 which abuts the tubular housing 18 when the rod 13 is properly inserted and aligned as indicated above. There are no other securing fixtures so that the forward pressure of the ground meat holds each rod 13 firmly inside each tubular housing 18. The rods 13 are, therefore, easily removable for cleaning. Additionally, the near end of each rod 13 is tapered 32 to permit a smooth flow of meat. These rods create the perforations in the ground meat as it passes through the apparatus.

The collar section, as shown in FIG. 2, has four equally spaced threaded bores 34 for attachment to the shaping section 14 with fastening means 27.

The portion of the apparatus which shapes and compresses the ground meat is comprised of four primary elements, including the attachment ring 21, the shaping section 14, the reinforcing disk 23, and the finishing section 16. The attachment ring 21 is a stainless steel ring with a countersink 24 having a diameter slightly larger than the outside diameter of the collar section 11 to ensure a tight fit. The shaping section 14 is welded onto the attachment ring 21. Four equally spaced bores 26 are drilled corresponding to the threaded bores on collar section 11, whereby fastening means 27 can be inserted to tightly couple the shaping section 14 with the collar section 11.

The shaping section 14 is a unitary structure formed from-sheet stainless steel which has a longitudinally tapering shape for transforming and compressing the ground meat from a circular to a semi-square shape. The shaping section 14 is constructed by pressing a generally conical stainless steel formed tube into a squeezed shape in such a manner that the overall cross-section of the shaping section gradually changes axially from a round to a generally square shape, as can be seen in FIG. 3.

The finishing section 16 is a squared tubular extension, having rounded corners, which is of constant shape and is welded at 28 together with the shaping section 14.

A reinforcing disk 23 is circularly shaped and is welded over the connection between the shaping section 14 and the finishing section 16, thereby providing enhanced structural support to the weld.

In the operation of the extrusion apparatus, the perforation rods 13 are inserted into the tubular housings 18 in the collar section 11 of the apparatus. Each rod 13 is positioned as the locating pin 30 on the near end of each rod aligns with the keyway 31 inside the tubular housings 18. The perforation rods 13 extend the full length of the apparatus. The extrusion apparatus is then attached to the discharge end of a conventional meat grinder or the like. As semi-frozen meat is ground up and exits the grinder, it is forced into the extrusion apparatus, with the pressure from the meat insuring the full seating of the perforation rods 13 as previously discussed. The tapered ends of the rods 32 and the bevelled edges of the support arms 19 provide minimum impedance to the flow of meat. The meat being forced through the apparatus is compacted around the perforating rods 13 and shaped by the shaping section 14. During this compacting process the pressure within the apparatus is significant. Two factors address this pressure: firstly, the reinforcing disk 23 acts not only to reinforce the weld 28 between the shaping section 14 and the finishing section 16, but also provides reinforcement for the entire apparatus. Secondly, the fastening means 27 connecting the shaping section 14 with the collar section 11 are designed to break away before the pressure ruptures the nozzle.

The extrusion of the meat as it passes through the shaping section 14 changes from a generally round shape into a generally square shape, with the perforation rods 13, providing four perforations in the compacted brick shape. The finishing section 16 provides constant shaping for the remainder of the length of the apparatus. The meat exits the apparatus in a brick-like form. The extruded, perforated meat brick then can be longitudinally sliced into patties for use or shipment.

Figure 7:
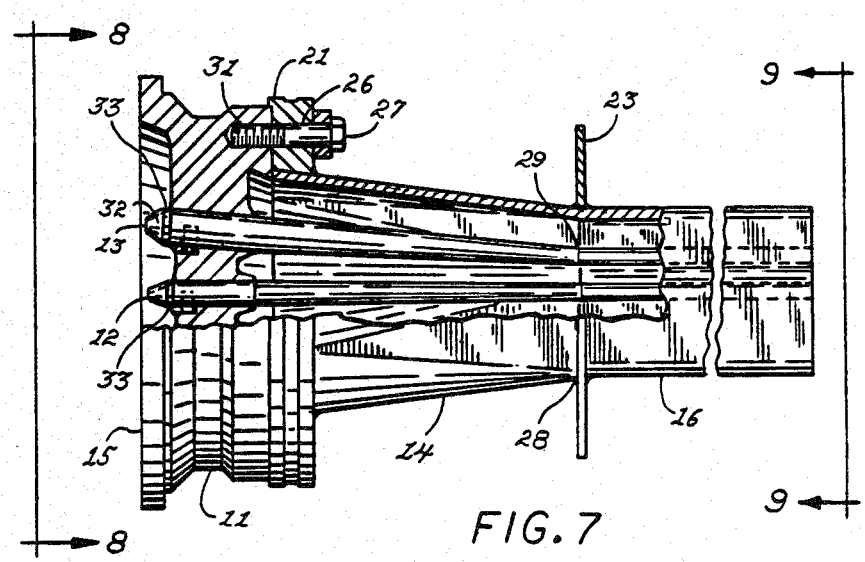
FIG. 7 is a cross-sectional side view of the additional embodiment with five perforation rods.
Figure 8:
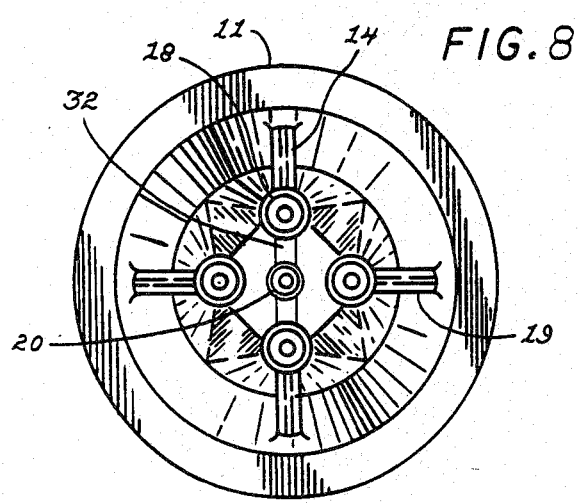
FIG. 8 is a rear plan view of the additional embodiment with five perforation rods taken along line 8—8.
Figure 9:
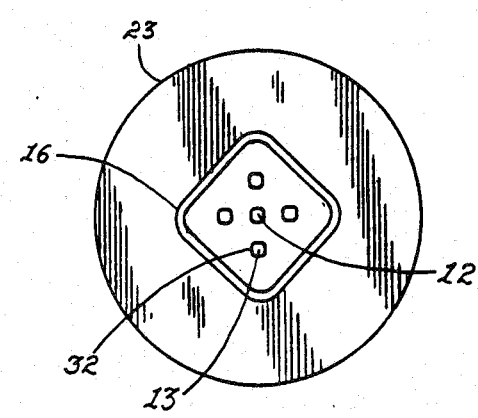
FIG. 9 is a front plan view of the additional embodiment with five perforation rods taken along line 9—9.

An alternative embodiment as shown in FIGS. 6-9 employs the use of a central perforation rod 12 axially aligned with the extrusion apparatus in order to produce five perforations. The central rod 12 is of a reduced diameter and is coaxial with the extrusion apparatus, thereby not requiring the bend 29 which is unique to the lateral perforation rods 13. The control rod 12 does, however, utilize the locating pin 30 as shown in FIG. 7. In order to accommodate the central rod 12, an additional tubular housing 20 with a keyway 31 is mounted, using spacer bars 32, between two lateral tubular housings 18 on the collar section 11. The central rod 12 also has a flanged end 33 which abuts the central tubular housing 20. The central rod 12 also extends the length of the apparatus and provides for the extruded brick-like form to have five perforations.

While the invention has been described in connection with a preferred embodiment, it will be understood that it is not intended to limit the invention thereto, rather is intended to cover all modifications and alternative constructions falling within the spirit and scope of the invention as expressed in the appended claims.

I claim as my invention:

1. An extrusion apparatus for the shaping of semi-frozen ground meat, being attachable to a source of meat delivered under pressure, such as a meat grinder having a nozzle discharge member, comprising in combination:

a. a collar member including a first end adapted for attachment to said nozzle member, and having a plurality of housings excluding internal support means for individually receiving removable perforation means and located adjacent the nozzle discharge and positioned to be in the region of the least amounts of pressure exerted by meat exiting from said nozzle, and said collar including a second end having means for the attachment of a shaping structure;

b. a unitary shaping structure having corresponding means for attachment to said collar member, and including interior walls which are a joinder of a generally circular shape having a transition end to a generally square shape with a generally square finishing end shape;

c. reinforcing means disposed about the joinder of said circular and square shaped transitions to the square finishing end; and d. said individually removable perforation means comprising elongated perforation rods insertable into the housings and received in the support means and extending the length of said extrusion apparatus and held in place within said housings by pressure from said ground meat and easily removable by withdrawing said rods for ease in cleaning.

2. An extrusion apparatus as claimed in claim 1 wherein said rods are angled to be generally parallel to said interior walls of said extrusion apparatus.

3. An extrusion apparatus as claimed in claim 1 wherein said multiple perforation rods comprise four lateral rods running the length of said extrusion apparatus.

4. An extrusion apparatus as claimed in claim 1 wherein said multiple perforation rods comprise four lateral rods running the length of said apparatus and a central rod running the length of and being coaxial with said apparatus.

5. An extrusion apparatus as claimed in claim 1 whereby the attachment means between the collar and shaping structure have excess pressure prevention means comprising break-away fastening means which rupture when said pressure exceeds preselected containment tolerances.

6. An extrusion apparatus as claimed in claim 1 constructed of stainless steel, being highly polished to minimize impedance and friction within said apparatus.

* * * * *